United States Patent
Chen et al.

(10) Patent No.: US 11,047,680 B2
(45) Date of Patent: Jun. 29, 2021

(54) MULTI-NODE DATA SYNCHRONOUS ACQUISITION SYSTEM AND METHOD FOR REAL-TIME MONITORING OF UNDERWATER SURFACE DEFORMATION

(71) Applicant: Zhejiang University, Zhejiang (CN)

(72) Inventors: Jiawang Chen, Zhejiang (CN); Huangchao Zhu, Zhejiang (CN); Chunying Xu, Zhejiang (CN); Chen Cao, Zhejiang (CN); Zhou Yu, Zhejiang (CN); Jun Han, Zhejiang (CN); Yuan Lin, Zhejiang (CN)

(73) Assignee: Zhejiang University, Hangzhou (CN)

( * ) Notice: Subject to any disclaimer, the term of this patent is extended or adjusted under 35 U.S.C. 154(b) by 101 days.

(21) Appl. No.: 16/393,150

(22) Filed: Apr. 24, 2019

(65) Prior Publication Data
US 2019/0323836 A1    Oct. 24, 2019

(30) Foreign Application Priority Data
Apr. 24, 2018    (CN) .......................... 201810373718.3

(51) Int. Cl.
*G01C 7/02*      (2006.01)
*G01B 21/32*    (2006.01)
(Continued)

(52) U.S. Cl.
CPC .............. *G01C 7/02* (2013.01); *G01B 21/32* (2013.01); *G01C 13/00* (2013.01); *G01C 15/00* (2013.01)

(58) Field of Classification Search
CPC .... G01C 13/00; G01C 13/008; G01C 13/002; G01C 13/004; G01C 13/006; G01C 5/06; G01N 33/1886; G01N 33/18; G01N 1/12; G01N 2001/021; G01N 1/10; G01N 1/16; G01N 33/1806; G01N 1/14; G01N 2021/6432; G01N 2021/6434; G01N 21/763; G01N 21/78; G01N 21/80; G01N 33/1826; G01N 33/24; G01N 3/42; G01N 15/04; G01N 17/008; G01N 1/04; G01N 1/18; G01N 1/2035; G01N 1/22; G01N 2015/0088; G01N 2021/1772;
(Continued)

(56) References Cited

U.S. PATENT DOCUMENTS 9,448,311 B2 *  9/2016  Maxwell ................. G01V 1/38
10,393,898 B2 *  8/2019  Maxwell ................. G01V 1/38

* cited by examiner

*Primary Examiner* — Andre J Allen

(57) ABSTRACT

A multi-node data synchronous acquisition system and a method for real-time monitoring of underwater surface deformation. The system includes at least four sensor arrays, where each of the sensor array consists of a plurality of ribbon-like rigid substrates connected by movable joints. On each section of rigid substrate, three sensor units are respectively connected to a slave station data acquisition unit through cables. The slave station data acquisition unit is connected with a central controller through a cable. The central controller includes a compressive cabin outside and an embedded controller and a power supply inside. Each slave station data acquisition unit acquires data from an MEMS attitude sensor and then transmits it to the embedded controller. The present invention may realize synchronous acquisition of underwater or even underwater multi-node data, implement three-dimensional surface reconstruction, and may be used for improving the ocean observation capability.

7 Claims, 5 Drawing Sheets

(51) Int. Cl.
  *G01C 13/00* (2006.01)
  *G01C 15/00* (2006.01)
(58) Field of Classification Search
  CPC ... G01N 2021/1793; G01N 2021/4769; G01N 2021/556; G01N 2033/1873; G01N 2035/00881; G01N 21/15; G01N 21/55; G01N 2203/0082; G01N 2203/0682; G01N 33/246; G01N 3/064; G01N 3/34; G01N 7/14
  USPC .......................................... 73/170.29–170.34
  See application file for complete search history.

MULTI-NODE DATA SYNCHRONOUS ACQUISITION SYSTEM AND METHOD FOR REAL-TIME MONITORING OF UNDERWATER SURFACE DEFORMATION

CROSS-REFERENCE TO RELATED APPLICATIONS

This application claims the benefit of priority from Chinese Patent Application No. CN 201810373718.3, filed on Apr. 24, 2018. The content of the aforementioned application, including any intervening amendments thereto, is incorporated herein by reference in its entirety.

TECHNICAL FIELD

The present invention relates to the technical field of ocean observation, and more particularly to a multi-node data synchronous acquisition system and a method for real-time monitoring of underwater surface deformation.

BACKGROUND OF THE INVENTION

There are abundant mineral resources in the ocean covering about 75 percent of the Earth's surface. Many technical equipment and projects of building ports, laying underwater pipelines and measuring channels are needed in an ocean exploration and development process. In the 21st century, the economic development of various countries in the world is inseparable with the vast ocean. In particular, with the rapid development of the economy and the explosion of the population, the demand for energy increases rapidly, people set their sights on the ocean, especially the deep sea, to survey, develop and utilize the ocean resources. China is a country having a sea area covering nearly 3 million square kilometers, so it is significant to develop and research the ocean. Underwater monitoring becomes a vital part of the research on ocean and underwater engineering construction. At present, relevant techniques in a ground surface monitoring project are relatively mature. The intelligent monitoring technique is booming, and an observation system is perfectly developed. However, the underwater curved surface monitoring is poor in research foundation. As China vigorously develops the marine industry, the underwater surface monitoring is applied in more fields. For underwater topography monitoring, such as exploration and trial production of underwater natural gas hydrates, the natural gas hydrates are extremely fragile on the seabed as their structural stability is susceptible to changes in temperature and pressure. This will cause large-scale changes in underwater topography, and destroy underwater engineering facilities such as deep-sea oil pipelines and underwater monitoring. Accordingly, it is important and urgent to monitor the underwater surface deformation.

Time synchronization may be a challenge for data acquisition in the deep sea, especially on the seabed. The time synchronization is one of the key techniques of an underwater sensor network. It is meaningful to match data acquired by distributed sensor nodes with time information, which is the basis for achieving techniques of network collaborative work, collaborative sleep and the like. Currently, the technique of the time synchronization of systems on land is relatively mature. However, the environment in the ocean is more complex. The most common way is to use the time synchronization technique of a GPS-based distributed data acquisition system on land, but seawater may shield transmission of electromagnetic waves, light waves, and other signals. Accordingly, it is impossible to use, in a deep-sea environment, an independent high-precision clock reference source such as a GPS or a Beidou time scaler universal on land. In this way, it is very important to know how to realize multi-node and long-term synchronous acquisition of deep-sea sensing data. Meanwhile, this method may be effectively applied to a case where the universal, independent and high-precision clock reference source may be unavailable, which has a good expandability.

The Chinese Patent Application No. CN105674945A discloses a underwater landslide monitoring apparatus based on an MEMS sensor and a monitoring method thereof. A monitoring unit consists of a plurality of monitoring sub-units connected in series. The monitoring unit is disposed in a protective cover. The monitoring unit transmits a monitored signal to a processing unit. The processing unit transmits the processed signal to a computer terminal. The MEMS sensor is fixed in a long tube, and one end of the long tube is connected with one end of a flexible connection tube. The MEMS sensor is connected with a data input port of a data processor. The data processor transmits the processed data to the computer terminal. However, on the one hand, an array structure of the present invention is of a circular tube shape. It is necessary to prevent the array structure from being twisted in a deployment process. The longer the distance is, the greater the probability of deformation is. The deployment difficulty is greatly increased. On the other hand, the sensor in the array is an acceleration sensor. The series deployment is only capable of monitoring two-dimensional deformation rather than effectively monitoring three-dimensional deformation in a monitoring area, so data synchronous acquisition cannot be ensured.

The Chinese Patent Application No. CN107339969A discloses an underwater surface deformation monitoring system based on an MEMS attitude sensor, including a computer, an underwater data storage unit and a plurality of parallel ribbon-like sensor arrays. The computer is connected with each sensor array through the underwater data storage unit. Each sensor array is sealed from outside by a packaging material, and includes multiple sections of rectangular tubes connected by flexible joints inside. One MEMS attitude sensor is arranged in each section of rectangular tube. Each MEMS attitude sensor is connected with an acquisition unit through a cable. The acquisition unit is connected with an underwater master control unit. The MEMS attitude sensor is a 9-axis attitude sensor including a three-axis accelerometer, a three-axis gyroscope and a three-axis magnetometer, which is capable of fusing obtained acceleration data, angular velocity data and magnetic field strength data to obtain attitude information and displaying them in a data form of an Euler angle or quaternion. However, the underwater surface deformation monitoring system of the present invention is incapable of guaranteeing data synchronous acquisition, so that the subsequent three-dimensional reconstruction precision is poor. Moreover, each sensor array is poor in reliability due to the stainless steel rectangular tubes and the rubber flexible joints, and has a probability of deformation because the joints are easily damaged. The 9-axis attitude sensor serves as the MEMS attitude sensor, which is high in energy consumption and is not suitable for long-term underwater deployment.

SUMMARY OF THE INVENTION

A technical problem to be solved by the present invention is to overcome the deficiencies in the prior art and provide a multi-node data synchronous acquisition system and a method for real-time monitoring of underwater surface deformation.

In order to solve the technical problem, the present invention has the following solution.

There is provided a multi-node data synchronous acquisition system for real-time monitoring of underwater surface deformation, including a central controller and sensor arrays provided with MEMS attitude sensors. The system includes at least four sensor arrays, and each of the four sensor arrays consists of a plurality of sections of ribbon-like rigid substrates connected by movable joints. Three sensor units and one slave station data acquisition unit are arranged on each section of rigid substrate. The sensor unit includes a compressive cabin outside and an MEMS attitude sensor and a power supply inside. Each slave station data acquisition unit includes a compressive cabin outside and a slave station data acquisition unit control board and the power supply inside. The three sensor units are respectively connected to the slave station data acquisition unit through cables. The slave station data acquisition unit is connected to a central controller through the cable. The central controller includes a compressive cabin outside and an embedded controller and the power supply inside. The slave station data acquisition unit acquires data from the MEMS attitude sensors and then transmits it to the embedded controller.

In the present invention, the slave station data acquisition units are connected with the sensor units and the central controller through waterproof connectors and cables, respectively.

In the present invention, the MEMS attitude sensor is a 3-axis acceleration sensor capable of fusing obtained acceleration data to obtain attitude information and displaying it in a data form of a quaternion or Euler angle.

In the present invention, a clamp for radial surrounding is disposed outside the compressive cabin of the sensor unit, and the sensor unit is mounted on a mounting position of the rigid substrate by the clamp.

In the present invention, the compressive cabin of the central controller is provided with a spike fixing member for fixation at the lower end and an (elliptical) annular suspension hook at the upper end.

In the present invention, the rigid substrates are stainless steel plates. The movable joint connecting adjacent rigid substrates is a stainless steel movable hinge. A rotary suspension ring for connecting an underwater mechanical arm is arranged at a head end of each sensor array. The power supply includes a 5V mobile power supply and a 24V lithium battery pack. The former supplies power to the slave station data acquisition unit, and the latter is formed by series or parallel connection of lithium batteries to supply power for each central controller. A data transmission is realized between the sensor units and the slave station data acquisition unit through analog IIC buses. The data transmission is realized between the slave station data acquisition unit and the central controllers through CAN buses. Synchronous time signals are transmitted and issued by an I/O port.

The present invention further provides a multi-node data synchronous acquisition method for real-time monitoring of underwater surface deformation using the foregoing system, including:

(1) building a synchronous acquisition system, assembling the synchronous acquisition system, where each central controller is provided with at least 4 sensor arrays; a circuit connection relationship between the central controllers and the slave station data acquisition units as well as the sensor units is as follows: every three sensor units as a group are connected to one slave station data acquisition unit, and independently transmit data through three analog IIC buses, each of the analog IIC buses includes an SDA cable and an SCL cable, and the SDA and the SCL are respectively connected to a VCC interface of the acquisition unit through pull-up resistors, each slave station data acquisition unit transmits data to the central controller through a common CAN bus, the CAN bus includes a CAN_H, a CAN_L and two 120Ω terminal resistors, and a CAN controller determines a bus level based on a potential difference between the CAN_H cable and the CAN_L cable (the bus level includes a dominant level and a recessive level, it is one or the other, and a transmitter transmits a message to a receiver by changing the bus level);

(2) lowing the synchronous acquisition system to the seabed by an underwater winch, and mounting it by utilizing an underwater robot, so that the spike fixing member at the lower end of the central controller is inserted into a underwater formation for fixation, and grasping a rotary suspension ring at the head end of each sensor array by the underwater robot to drag each sensor array to be evenly arranged on the seabed in a radial direction using the central controller as a center (for example, four sensor array are crossed);

(3) taking a clock of the central controller as a master clock of the system, sequentially transmitting calibration time point information to each slave station data acquisition unit through a CAN bus in advance, simultaneously issuing time signals by an I/O port, and simultaneously calibrating respective time by the slave station data acquisition unit after receiving the time signals to achieve relative synchronization of the clock of the data acquisition system; and (4) after the sensor units acquire acceleration data of each physical point, transmitting the data to the adjacent slave station data acquisition unit through an analog IIC bus, time-stamping the data by the slave station data acquisition unit after classifying and numbering, then transmitting the data to the CAN bus, and summarizing the data of the slave station data acquisition units by the central controller through the CAN bus to complete storage and preprocessing of the data.

Principles

In the technical solution of the present invention, the sensor arrays of the sensor nodes are carriers for providing mounting spaces for the slave station data acquisition units and the MEMS accelerometer acquisition nodes, and are composed of a plurality of sections of ribbon-like rigid substrates and intermediate movable joints. The MEMS accelerometer sensors and the compressive cabins of the slave station data acquisition units are arranged on respective sections of ribbon-like rigid substrates. Each section is 50 cm in length, and the sections are connected by the movable joints. The MEMS accelerometer acquisition nodes acquire acceleration data of each physical point for reconstruction of the subsequent three-dimensional underwater topography. The slave station data acquisition units are arranged within the compressive cabins, and acquire the data of the three adjacent MEMS acceleration sensor acquisition nodes through analog IIC buses. Each datum is time-stamped at the end, and the acquired data is transmitted to the CAN buses, so that transfer and long-distance transmission of the data are realized. The central controller is also arranged within the compressive cabin, and as a main clock, issues a regular time instruction through an I/O port to realize relative time synchronization of the system, and acceleration data in the slave station data acquisition units is summarized through the CAN buses to complete storage and pre-processing of the data.

The sensor arrays of the sensor nodes are lowered to the seabed by the underwater winch, the rotary suspension ring at the head end of each sensor array is grabbed by a ROV to drag and pull the sensor array coiled in a winch turntable, and the four sensor arrays are placed on the seabed in a cross shape using the underwater winch as a center. The central controller is placed on the seabed by a rope, and then installed by the ROV, so that a spike fixing member at the lower end thereof is inserted into a seabed formation for fixing the compressive cabin. The MEMS accelerometer acquisition nodes may acquire the acceleration data of each physical point, and then transmit the data to the adjacent slave station data acquisition units through the analog IIC buses. After the slave station data acquisition unit classifies and numbers the data, it time-stamps the data and then transmits the time-stamped data to the CAN bus. The central controller summarizes the data of each slave station data acquisition unit through the CAN bus, and completes storage and pre-processing of the data. Moreover, the central controller sequentially transmits calibration time point information to each slave station data acquisition unit through the CAN bus, and then periodically calibrates the time of the slave station data acquisition unit using the I/O port to achieve relative data synchronous acquisition of the system.

Preferably, the compressive cabin of the central controller and the compressive cabins of the slave station data acquisition units are cylindrical cabins, with the advantages of being easy to manufacture, high in utilization rate of internal spaces and small in fluid movement resistance. Each compressive cabin is made of stainless steel, which is good in comprehensive performance, resistant to high pressure and corrosion and easy to machine. Each compressive cabin is internally provided with components such as a main control board, a storage module and a power supply. It is necessary to replace the power supply and extract the stored data in a use process, so that a reliable static seal is required between the compressive cabin and an upper end cover. The present invention adopts a rubber O-shaped ring sealing method. O-shaped rings are mounted within corresponding closed sealing grooves to ensure that no leakage is caused during underwater operation. More preferably, the O-shaped rings are selected from two specifications with wire diameters of 10 mm and 5.7 m, respectively, and the inner diameters of the O-shaped rings are determined according to radial dimensions of the compressive cabins.

The MEMS accelerometer acquisition nodes are configured to acquire acceleration data of each physical point for subsequent three-dimensional surface reconstruction. As an application example, the MEMS accelerometer acquisition nodes may employ ADXL335. The main control boards of the slave station data acquisition units are configured to classify and number the acceleration data and time-stamp it. As an application example, control units of the main control boards of the slave station data acquisition units may employ STM32F103ZET6. The control board of the central controller is configured to summarize the data of each slave station data acquisition unit, complete storage and pre-processing of the data, and transmit the calibration time point information in advance and periodically transmit a time instruction to achieve relative data synchronous acquisition of the system. As an application example, the control board of the central controller may employ a CX5100 of BECKHOFF. The storage module is configured to store data obtained from the MEMS acceleration sensor acquisition nodes. As an application example, the storage module may employ a Micro SD card read-write module and a 32 GB Micro SD card of BECKHOFF. A power module is configured to supply voltages of respectively 24V and 5V to the central controller and the slave station data acquisition units, wherein the voltage 24V is provided by lithium batteries in series or in parallel. As an application example, the 5V lithium batteries of the SCUD may be employed.

Compared with the prior art, the present invention has the following beneficial effects.

(1) The multi-node data synchronous acquisition system for real-time monitoring of underwater surface deformation of the present invention may realize synchronous acquisition of underwater or even underwater multi-node data, implement three-dimensional surface reconstruction, and may be used for improving the ocean observation capability.

(2) The present invention innovatively proposes a manner of matching the IIC buses with the CAN buses to realize long-distance transmission of the data, utilizes the clock of the master station as the clock source of the system and adopts a manner of issuing the time instructions by the I/O port on time to implement the time synchronization within the system, and may effectively solve the problem of time synchronization of the system in which the independent high-precision clock such as the GPS or Beidou time scaler universal on land may not be used as a reference source.

(3) In the present invention, the ribbon-like rigid substrates on which the sensor arrays of the sensor nodes are mounted are made of stainless steel plates, the movable joints among the sections are stainless steel movable hinges, the rotary suspension ring is arranged at the head end of each sensor array at which the sensor nodes are mounted, and the sensor array is further provided with a hoop, so that the system may work stably and reliably, and is greatly convenient to mount and deploy underwater.

Figure 1:
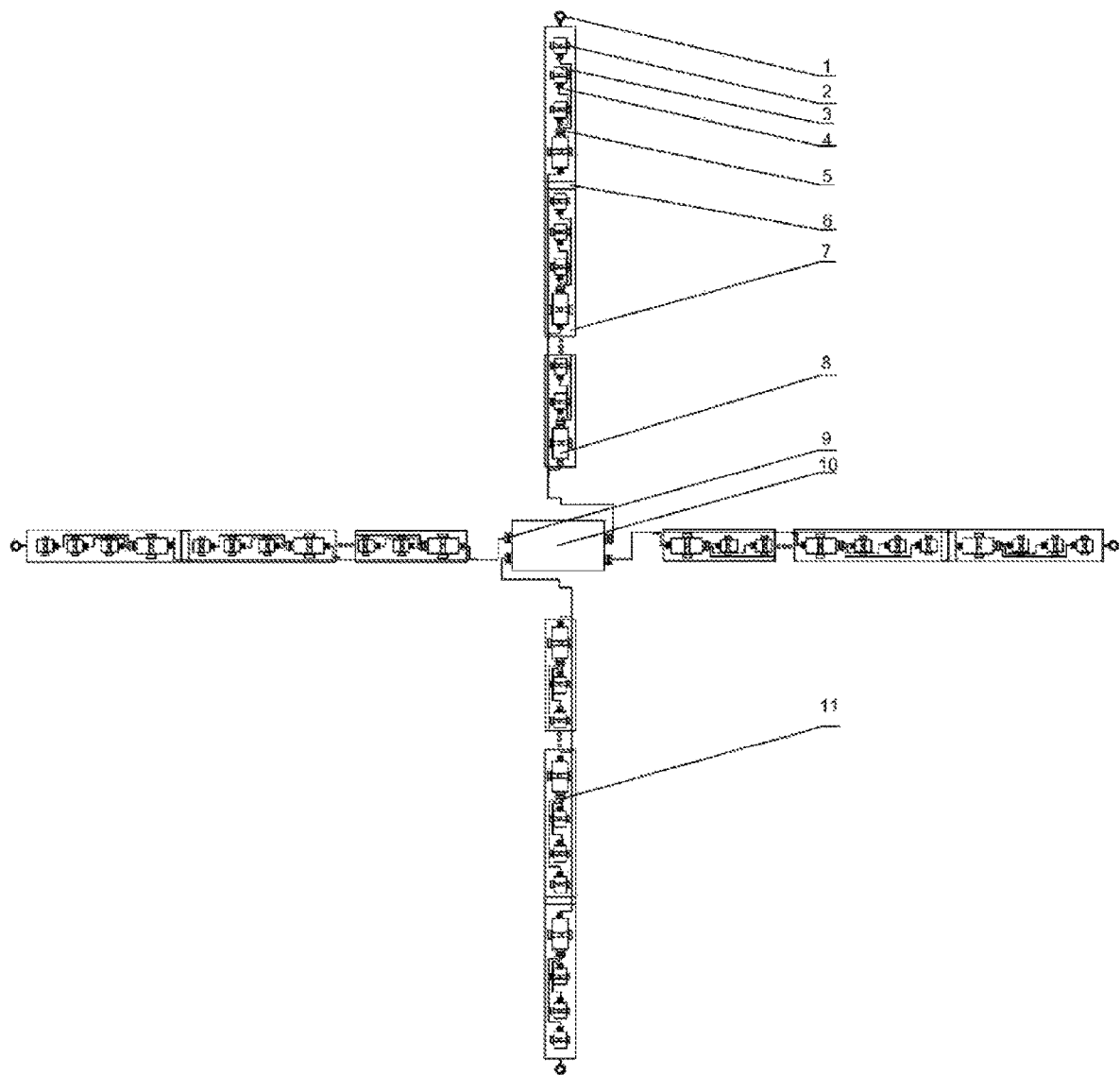
FIG. 1 is a schematic diagram showing an overall external structure of the present invention.
Figure 2:
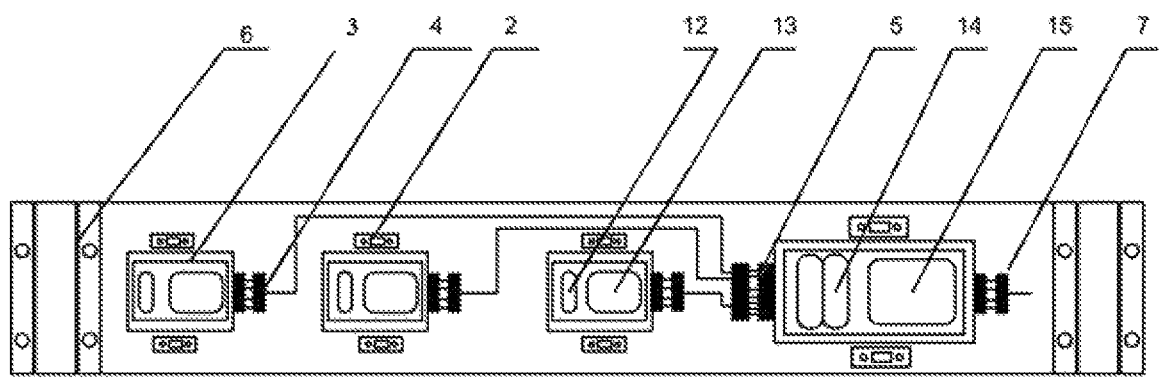
FIG. 2 is a partial schematic diagram of a sensor array of an MEMS sensor node of the present invention.
Figure 3:
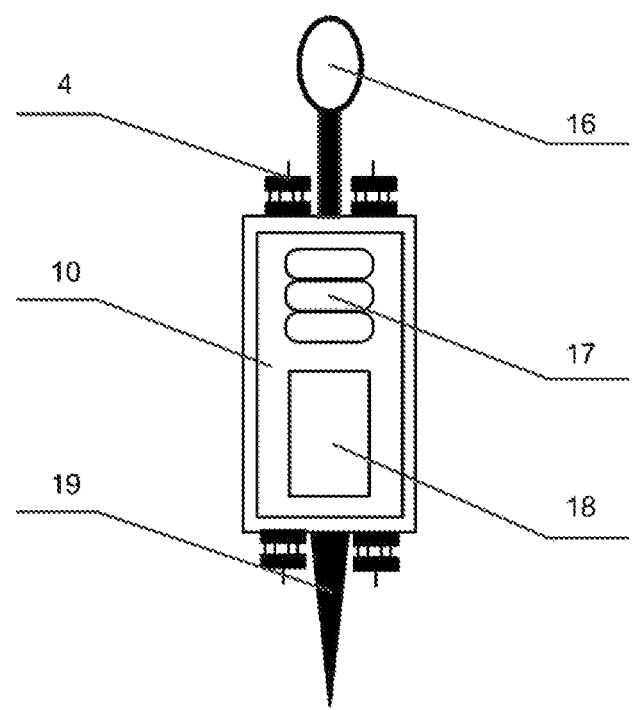
FIG. 3 is a schematic diagram of a central controller of the present invention.
Figure 4:
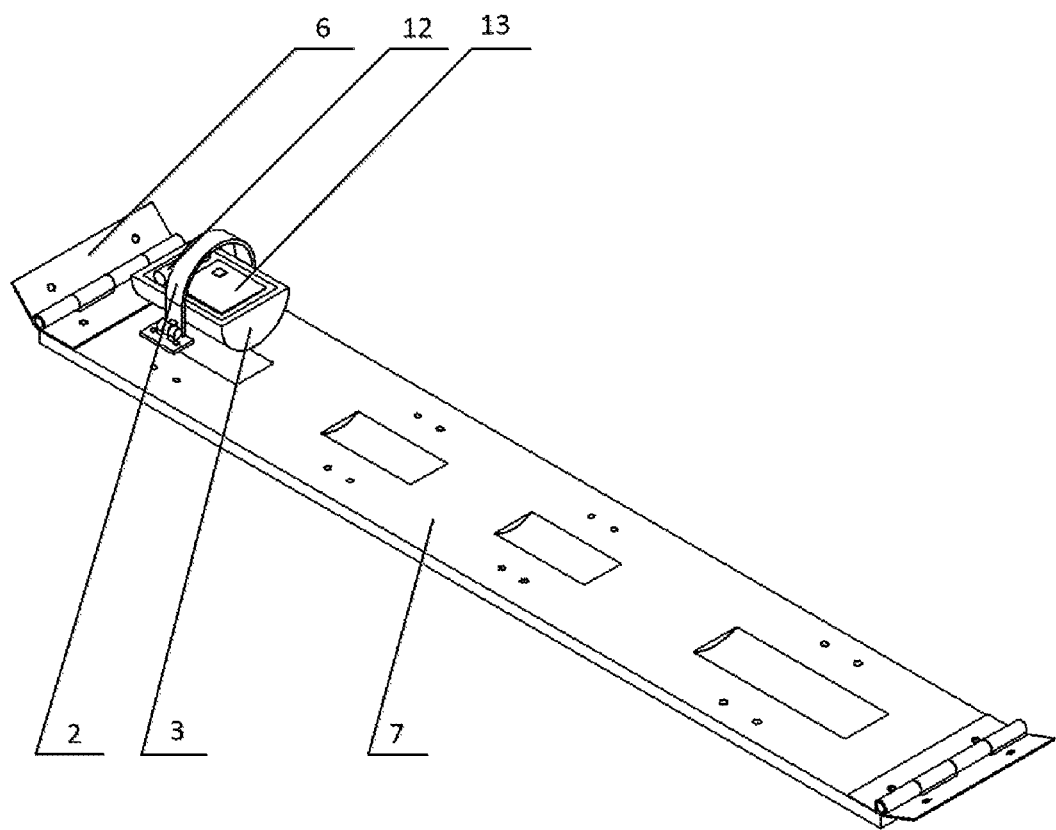
FIG. 4 is a schematic diagram showing the installation of a sealing housing of the present invention.

Reference numerals in accompanying drawings: 1—rotary suspension ring; 2—clamp; 3—sensor unit; 4—four-core waterproof connector; 5—eight-core waterproof connector; 6—movable joint; 7—rigid substrate; 8—slave station data acquisition unit; 9—four-core waterproof connector; 10—central controller; 11—sensor array; 12—power supply; 13—MEMS attitude sensor; 14—power supply; 15—slave station data acquisition unit control board; 16—annular suspension hook; 17—power supply; 18—central controller control board; and 19—spike fixing member.

DETAILED DESCRIPTION OF EMBODIMENTS

A multi-node data synchronous acquisition system for real-time monitoring of underwater surface deformation will be further described in detail below with reference to accompanying drawings and specific implementations.

As shown in FIG. 1 to FIG. 4, the multi-node data synchronous acquisition system for real-time monitoring of underwater surface deformation includes four sensor array 11 with rotary suspension rings 1 at head ends for connecting an underwater mechanical arm for deployment. Sensor units 3 and slave station data acquisition units 8 are respectively mounted on the sensor array by clamps 2. The sensor units 3 are internally provided with MEMS attitude sensors 13 (for example, 3-axis acceleration sensors) and 3.3V power supplies 12 for acquiring acceleration information of physical points where they are located. Four-core waterproof connectors 4 are mounted on upper end covers of the sensor units 3, and connected onto the adjacent slave station data acquisition units 8 through cables. The slave station data acquisition units 8 are internally provided with slave station data acquisition unit control boards 15 and 5V power supplies 14, and are responsible for acquiring data of acquisition nodes of the adjacent three sensor units 3 through analog IIC buses. Each datum is time-stamped at the end, and the acquired data is transmitted to CAN buses. Four-core waterproof connectors 4 and eight-core waterproof connectors 5 are respectively arranged at upper and lower end covers of each slave station data acquisition unit 8. The four sensor arrays 11 are arranged in a cross shape, and connected to the central controller 10 through cables in the middle. The data of each slave station data acquisition unit is summarized through the CAN bus to complete storage and pre-processing of the data. Calibration time point information is transmitted to each slave station data acquisition unit in advance through the CAN bus, and then the time of the slave station data acquisition unit is periodically calibrated by adopting the I/O port to achieve relative data synchronous acquisition of the system. The central controller 10 is internally provided with a central controller control board 18 and a 24V power supply 17. An upper end cover is provided with an elliptical suspension ring 16 for connection with the underwater mechanical arm during lowering. A lower end cover is provided with a spike fixing member 19 of a compressive cabin of the central controller for insertion into a seabed formation for fixing the compressive cabin.

Figure 5:
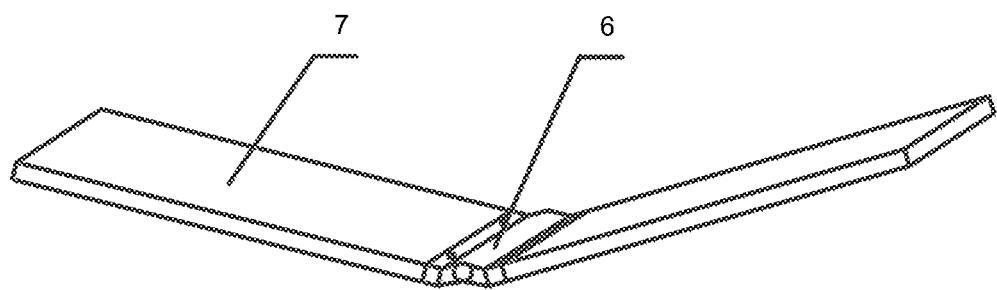
FIG. 5 is a schematic diagram showing the structures of a ribbon-like rigid substrate and an intermediate movable joint of the present invention.

As shown in FIG. 5, ribbon-like rigid substrates 7 and a movable joint 6 constitute a flexible sensor array. When the sensor array is deployed in a horizontal plane, an angle between the ribbon-like rigid substrates 7 is 0 degree. When changes in a surface, the angle between the ribbon-like rigid substrates 7 is changed by rotating the movable joint 6. Accordingly, this structure may greatly reduce the probability of deformation.

The present invention has the following working procedure:

(1) building a synchronous acquisition system, assembling the synchronous acquisition system, wherein each central controller 10 is provided with at least 4 sensor array 11, a circuit connection relationship between the central controllers 10 and slave station data acquisition units 8 as well as sensor units 3 is as follows: every three sensor units 3 as a group are connected to one slave station data acquisition unit 8, and independently transmit data through three analog IIC buses, each of the analog IIC buses includes an SDA cable and an SCL cable, and the SDA cable and the SCL cable are respectively connected to a VCC interface of the acquisition unit 8 through pull-up resistors, each slave station data acquisition unit 8 transmits data to the central controller 10 through a common CAN bus, the CAN bus includes a CAN_H, a CAN_L and two 120Ω terminal resistors, and a CAN controller determines a bus level based on a potential difference between the two cables CAN_H and CAN_L;

(2) lowing the synchronous acquisition system to the seabed by an underwater winch, and mounting it by utilizing an underwater robot, so that the spike fixing member at the lower end of the central controller 10 is inserted into a underwater formation for fixation, and grasping a rotary suspension ring 1 at the head end of each sensor array 11 by the underwater robot to drag each sensor array 11 to be evenly arranged on the seabed in a radial direction using the central controller 10 as a center;

(3) taking a clock of the central controller 10 as a master clock of the system, sequentially transmitting calibration time point information to each slave station data acquisition unit 8 through a CAN bus in advance, simultaneously issuing time signals by I/O port, and simultaneously calibrating respective time by the slave station data acquisition unit 8 after receiving the time signals to achieve relative clock synchronization of the data acquisition system;

(4) after the sensor units 3 acquire acceleration data of each physical point, transmitting the data to the adjacent slave station data acquisition unit 8 through an analog IIC bus, time-stamping the data by the slave station data acquisition unit 8 after classifying and numbering it, then transmitting the data to the CAN bus, and summarizing the data of the slave station data acquisition units by the central controller 10 through the CAN bus to complete storage and preprocessing of the data.

It should be noted that the above description is only preferred embodiments of the present invention, and not intended to limit the present invention. Any modifications, equivalent substitutions, improvements, and the like, which are made within the spirit and principles of the present invention, should fall in the scope of protection of the present invention.

What is claimed is:

1. A multi-node data synchronous acquisition system for real-time monitoring of underwater surface deformation, comprising:
 a central controller, and sensor array provided with MEMS attitude sensors;
 wherein the system comprises at least four sensor arrays, each of the sensor arrays consists of a plurality of sections of strip-shaped rigid substrates connected by movable joints, three sensor units and one slave station data acquisition unit are arranged on each section of rigid substrate; each sensor unit comprises a compressive cabin outside and an MEMS attitude sensor and a power supply inside, and each slave station data acquisition unit comprises a compressive cabin outside and a slave station data acquisition unit control board and a power supply inside; the three sensor units are respectively connected to the slave station data acquisition unit through cables, and the slave station data acquisition unit is connected to the central controller through a cable; each central controller comprises a compressive cabin outside and an embedded controller and a power supply inside; and each slave station data acquisition unit acquires data from the MEMS attitude sensors and then transmits it to the embedded controller.

2. The system according to claim 1, wherein the slave station data acquisition units are connected with the sensor units and the central controllers through waterproof connectors and cables, respectively.

3. The system according to claim 1, wherein the MEMS attitude sensors are 3-axis acceleration sensors configured to measure acceleration data to obtain attitude information and displaying it in a data form of a quaternion or Euler angle.

4. The system according to claim 1, wherein a radial surrounding clamp is disposed outside the compressive cabin of each sensor unit, and each sensor unit is mounted on a mounting position of each rigid substrate by the clamp.

5. The system according to claim 1, wherein the compressive cabin of the central controller is provided with a spike fixing member for fixation at the lower end and an annular suspension hook at the upper end.

6. The system according to claim 1, wherein the rigid substrates are stainless steel plates, the movable joint connecting adjacent rigid substrates is a stainless steel movable hinge, a rotary suspension ring for connecting an underwater mechanical arm is arranged at a head end of each sensor array, the power supply comprises a 5V mobile power supply and a 24V lithium battery pack, wherein the 5V mobile power supply supplies power to the slave station data acquisition unit, and the 24V lithium battery pack is formed by series or parallel connection of lithium batteries to supply power to each central controller, the sensor units and the slave station data acquisition units realize data transmission through analog IIC buses, the slave station data acquisition units and the central controllers realize data transmission through CAN buses, and synchronous time signals are transmitted and issued by I/O port.

7. A multi-node data synchronous acquisition method for real-time monitoring of underwater surface deformation using the system according to claim 1, comprising:

(1) building a synchronous acquisition system, assembling the synchronous acquisition system, wherein each central controller is provided with at least four sensor arrays, a circuit connection relationship between the central controllers and slave station data acquisition units as well as sensor units is as follows: every three sensor units as a group are connected to one slave station data acquisition unit, and independently transmit data through three analog IIC buses, each of the analog IIC buses comprises an SDA cable and an SCL cable, and the SDA cable and the SCL cable are respectively connected to a VCC interface of the acquisition unit through pull-up resistors, each slave station data acquisition unit transmits data to the central controller through a common CAN bus, the CAN bus comprises a CAN_H, a CAN_L and two 120Ω terminal resistors, and a CAN controller determines a bus level based on a potential difference between the two cables CAN_H and CAN_L;

(2) lowing the synchronous acquisition system to the seabed by an underwater winch, and mounting it by utilizing an underwater robot, so that the spike fixing member at the lower end of the central controller is inserted into a underwater formation for fixation, and grasping a rotary suspension ring at the head end of each sensor array by the underwater robot to drag each sensor array to be evenly arranged on the seabed in a radial direction using the central controller as a center;

(3) taking a clock of the central controller as a master clock of the system, sequentially transmitting calibration time point information to each slave station data acquisition unit through a CAN bus in advance, simultaneously issuing time signals by I/O, and simultaneously calibrating respective time by the slave station data acquisition unit after receiving the time signals to achieve relative clock synchronization of the data acquisition system; and (4) after the sensor units acquire acceleration data of each physical point, transmitting the data to the adjacent slave station data acquisition unit through an analog IIC bus, time-stamping the data by the slave station data acquisition unit after classifying and numbering it, then transmitting the data to the CAN bus, and summarizing the data of the slave station data acquisition units by the central controller through the CAN bus to complete storage and preprocessing of the data.

\* \* \* \* \*